(12) United States Patent
Wang et al.

(10) Patent No.: US 10,803,663 B2
(45) Date of Patent: **\*Oct. 13, 2020**

(54) DEPTH SENSOR AIDED ESTIMATION OF VIRTUAL REALITY ENVIRONMENT BOUNDARIES

(71) Applicant: GOOGLE LLC, Mountain View, CA (US)

(72) Inventors: Zhaoguang Wang, Mountain View, CA (US); Mugur Marculescu, Mountain View, CA (US); Chris McKenzie, Mountain View, CA (US); Ambrus Csaszar, Mountain View, CA (US); Ivan Dryanovski, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,763

(22) Filed: Aug. 2, 2017

(65) Prior Publication Data
US 2019/0043259 A1 Feb. 7, 2019

(51) Int. Cl.
*G06T 19/00* (2011.01)
*H04N 13/25* (2018.01)
(Continued)

(52) U.S. Cl.
CPC ............ *G06T 19/003* (2013.01); *G06F 3/012* (2013.01); *G06F 3/04815* (2013.01);
(Continued)

(58) Field of Classification Search
None
See application file for complete search history.

(56) References Cited

U.S. PATENT DOCUMENTS

| 2005/0123171 A1* | 6/2005 | Kobayashi | ............. G06F 3/011 |
| | | | 382/103 |
| 2008/0071559 A1 | 3/2008 | Arrasvuori | |

(Continued)

FOREIGN PATENT DOCUMENTS

| GB | 2376397 A | 12/2002 |
| WO | 2016077798 A1 | 5/2016 |
| WO | 2016141208 A1 | 9/2016 |

OTHER PUBLICATIONS

Hewlett-Packard, VR Room-Scale Setup—HTC Vive: Setting up a physical space for using the HTC Vive, 2017, Technical White Paper 4AA6-9648ENW, pp. 1-2 (Year: 2017).*

(Continued)

*Primary Examiner* — Michael J Cobb

(57) ABSTRACT

A method for depth sensor aided estimation of virtual reality environment boundaries includes generating depth data at a depth sensor of an electronic device based on a local environment proximate the electronic device. A set of initial boundary data is estimated based on the depth data, wherein the set of initial boundary data defines an exterior boundary of a virtual bounded floor plan. The virtual bounded floor plan is generated based at least in part on the set of initial boundary data. Additionally, a relative pose of the electronic device within the virtual bounded floor plan is determined and a collision warning is displayed on a display of the electronic device based on the relative pose.

20 Claims, 8 Drawing Sheets

(51) Int. Cl.
| | |
|---|---|
| H04N 13/271 | (2018.01) |
| H04N 13/239 | (2018.01) |
| G06F 3/0481 | (2013.01) |
| G06F 3/01 | (2006.01) |
| G06T 19/20 | (2011.01) |
| H04N 13/344 | (2018.01) |
| H04N 13/00 | (2018.01) |

(52) U.S. Cl.
CPC ............ *G06T 19/006* (2013.01); *G06T 19/20* (2013.01); *H04N 13/239* (2018.05); *H04N 13/25* (2018.05); *H04N 13/271* (2018.05); *H04N 13/344* (2018.05); *H04N 2013/0081* (2013.01)

(56) References Cited

U.S. PATENT DOCUMENTS

| | | | |
|---|---|---|---|
| 2011/0230263 A1* | 9/2011 | Ng | A63F 13/28 463/31 |
| 2013/0120158 A1* | 5/2013 | Tombley | G08G 1/163 340/902 |
| 2014/0364212 A1* | 12/2014 | Osman | A63F 13/213 463/31 |
| 2015/0092015 A1* | 4/2015 | Stafford | G02B 27/017 348/46 |
| 2015/0193982 A1 | 7/2015 | Mihelich et al. | |
| 2015/0265920 A1* | 9/2015 | Kim | A63F 13/49 463/31 |
| 2015/0324003 A1* | 11/2015 | Kang | G06F 3/017 356/72 |
| 2016/0124502 A1 | 5/2016 | Sawyer et al. | |
| 2016/0163110 A1* | 6/2016 | Chang | G06T 7/73 345/633 |
| 2016/0261300 A1 | 9/2016 | Fei et al. | |
| 2016/0321827 A1 | 11/2016 | Xiao et al. | |
| 2017/0336863 A1* | 11/2017 | Tilton | G06F 3/012 |
| 2017/0358141 A1* | 12/2017 | Stafford | G06F 3/011 |
| 2018/0093186 A1* | 4/2018 | Black | A63F 13/213 |
| 2018/0276891 A1* | 9/2018 | Craner | G06T 19/003 |
| 2019/0260870 A1* | 8/2019 | Spivack | G06F 3/04847 |
| 2019/0340909 A1* | 11/2019 | Nguyen | G08B 21/02 |
| 2020/0026922 A1* | 1/2020 | Pekelny | G06K 9/00671 |

OTHER PUBLICATIONS

Misha Sra, Sergio Garrido-Jurado, Chris Schmandt, Pattie Maes, Procedurally Generated Virtual Reality from 3D Reconstructed Physical Space, 2016, VRST '16, Proceedings of the 22nd ACM Conference on Virtual Reality Software and Technology, pp. 191-200 (Year: 2016).*

Jackie (Junrui) Yang, Christian Holz, Eyal Ofek, Andrew D. Wilson, "DreamWalker: Substituting Real-World Walking Experiences with a Virtual Reality," UIST '19: Proceedings of the 32nd Annual ACM Symposium on User Interface Software and Technology, pp. 1093-1107,https://doi.org/10.1145/3332165.334787 (Year: 2019).*

International Search Report and Written Opinion dated Aug. 3, 2018 for International Application No. PCT/US2018/032583, 15 pages.

International Search Report and Written Opinion dated Jul. 13, 2018 for International Application No. PCT/US2018/027661, 14 pages.

U.S. Appl. No. 15/664,775, filed Jul. 31, 2017, entitled "Virtual Reality Environment Boundaries Using Depth Sensors".

Non-Final Office Action dated Oct. 5, 2018 for U.S. Appl. No. 15/664,775, 19 pages.

Final Office Action dated May 2, 2019 for U.S. Appl. No. 15/664,775, 25 pages.

International Preliminary Report on Patentability dated Feb. 13, 2020 for International Application No. PCT/US2018/032583, 9 pages.

Non-Final Office Action dated Sep. 13, 2019 for U.S. Appl. No. 15/664,775, 19 pages.

International Preliminary Report on Patentability dated Feb. 13, 2020 for International Application No. PCT/US2018/027661, 9 pages.

* cited by examiner

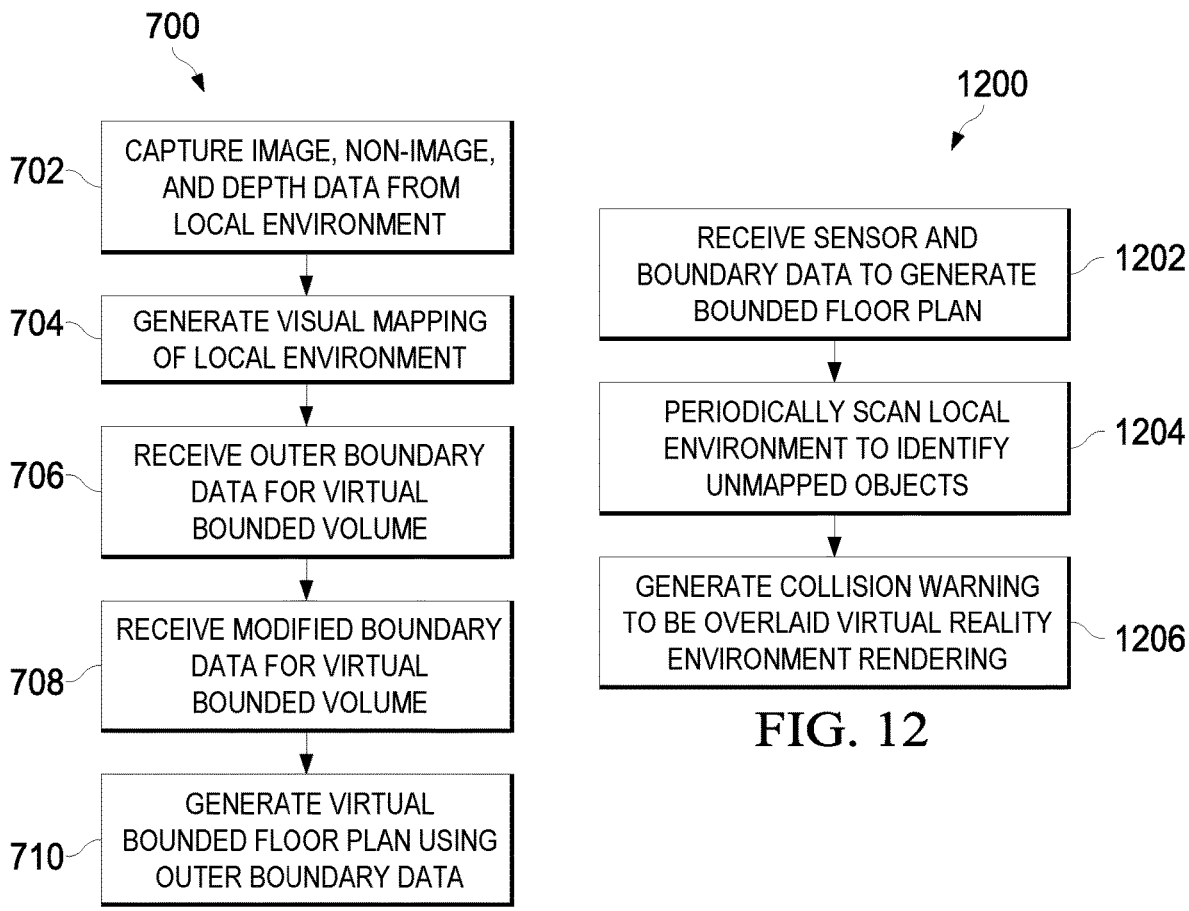
FIG. 7
FIG. 12
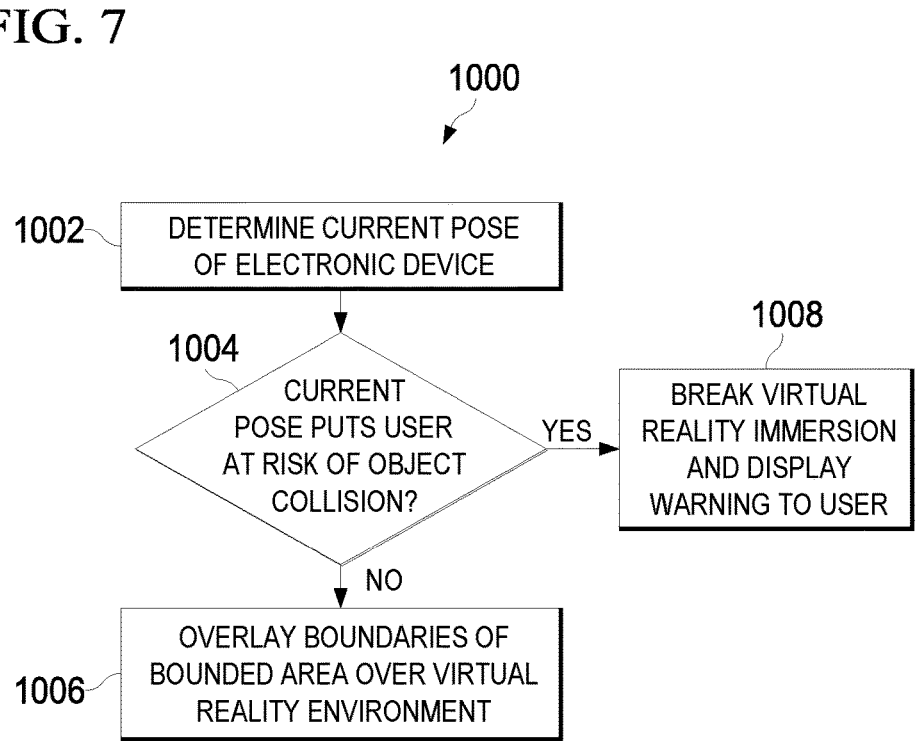
FIG. 10

DEPTH SENSOR AIDED ESTIMATION OF VIRTUAL REALITY ENVIRONMENT BOUNDARIES

BACKGROUND

Machine-vision-enabled devices may employ depth sensors to determine the depth, or relative distance, of objects within a local environment. For example, a head mounted display (HMD) system can employ depth sensors to identify the boundaries of an environment for generating a corresponding virtual environment for a virtual reality (VR) application. Typically, these depth sensors rely on the capture of reflections of known spatially-modulated or temporally-modulated light projected at the objects by the device. Some devices utilize the depth sensors to sense the depth of surrounding objects and detect obstacles. However, such devices are often power inefficient due to continuously performing depth sensing or require extensive calibration to designate certain areas of a room to be safe for navigation without colliding into objects. As such, the use of depth sensors in devices untethered to, for example, computing resources or power supplies by wire (e.g., mobile devices) can unnecessarily break virtual reality immersion or reduce the battery life of the devices during operation.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIG. 7 is a flow diagram illustrating a method for generating virtual bounded floor plans in accordance with at least one embodiment of the present disclosure.

FIG. 10 is a flow diagram illustrating a method for generating collision warnings in accordance with at least one embodiment of the present disclosure.

FIG. 12 is a flow diagram illustrating a method for generating unmapped object warnings in accordance with at least one embodiment of the present disclosure.

DETAILED DESCRIPTION

Figure 1:
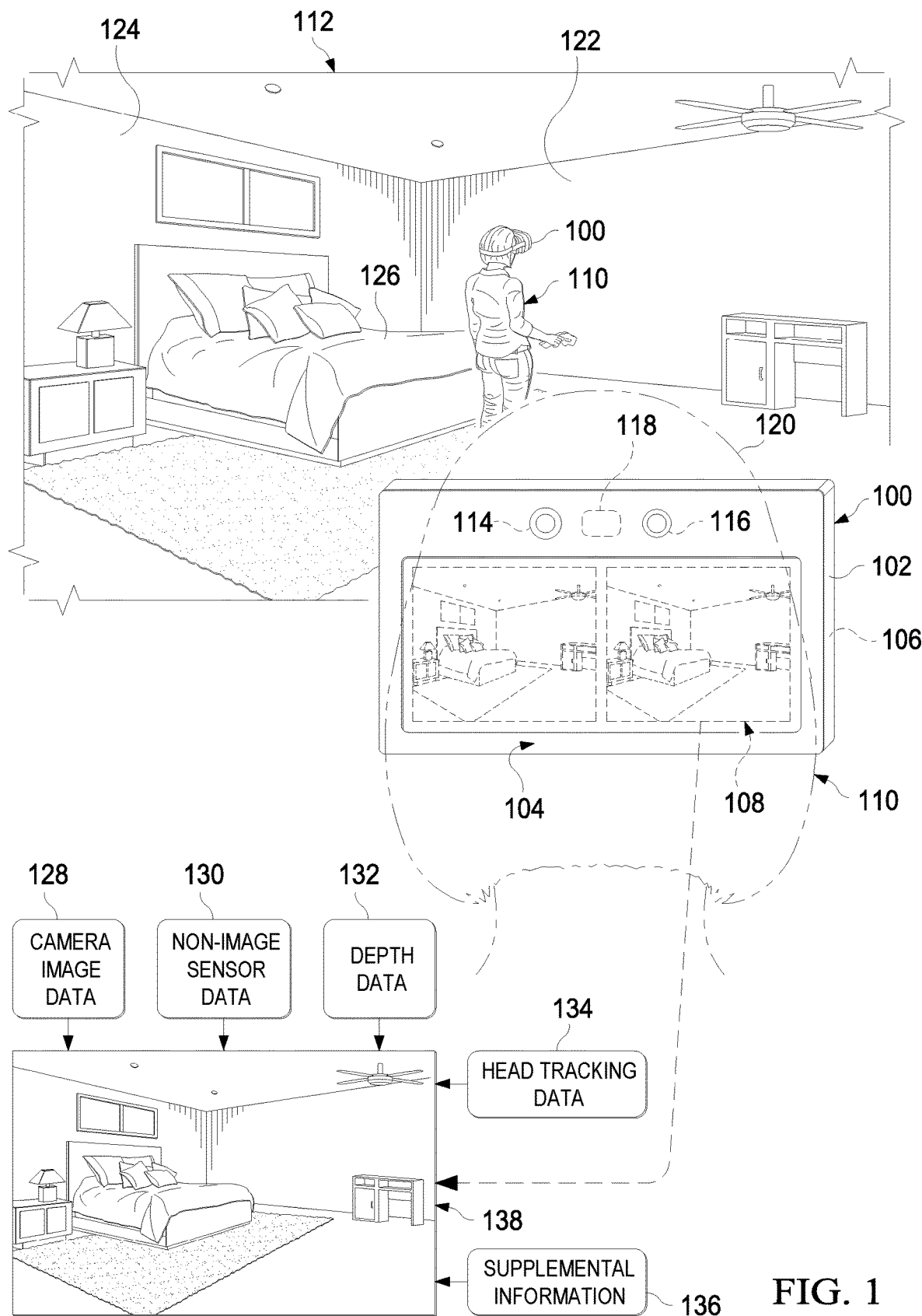
FIG. 1 is a diagram illustrating an electronic device configured to support location-based functionality in AR or VR environments in accordance with at least one embodiment of the present disclosure.

FIGS. 1-13 illustrate various techniques for the determination of a relative pose of an electronic device within a local environment, such as by employing depth sensors to identify the boundaries of an environment for generating a corresponding virtual environment for a virtual reality (VR) application. Relative pose information may be used to support location-based functionality, such as virtual reality (VR) functionality, augmented reality (AR) functionality, visual odometry or other simultaneous localization and mapping (SLAM) functionality, and the like. The term "pose" is used herein to refer to either or both of position and orientation of the electronic device within the local environment. In some embodiments, the electronic device includes two or more imaging cameras and a depth sensor disposed at a surface. The depth sensor may be used to determine the distances of spatial features representing objects in the local environment and their distances from the electronic device. The electronic device further may include another imaging camera on a surface facing the user so as to facilitate head tracking or facial recognition or to obtain additional imagery of the local environment.

The identification of the relative pose of objects in the local environment can be used to support various location-based functionality of the electronic device. To illustrate, in some embodiments, the relative positions of objects in the local environment are used, along with non-image sensor data such as orientation readings from a gyroscope, to determine the relative pose of the electronic device in the local environment. The relative pose of the electronic device may be used to facilitate visual odometry, indoor navigation, or other SLAM functionality. Moreover, the relative pose of the electronic device may be used to support augmented reality (AR) functionality, such as the graphical overlay of additional information in the display of imagery captured by the electronic device based on the relative position and orientation of the electronic device, and which also may be based on the position or the orientation of the user's head or eyes relative to the electronic device.

In some embodiments, the electronic device generates a point cloud map of objects in the local environment using depth data from the depth sensor. Further, the electronic device receives a set of outer boundary data defining an exterior boundary of a virtual bounded floor plan within which a user may navigate without colliding into objects. Similarly, the set of outer boundary data may be used in defining an exterior boundary of a virtual bounded volume (i.e., three-dimensional space) in which the user may navigate without colliding into objects. In some embodiments, the electronic device determines its pose relative to the local environment by tracking its position within the point cloud map. As such, the electronic device can provide location-based functionality without having to continually operate the depth sensor. Based on the relative pose information, the electronic device can present collision warnings for display to the user if the user begins to navigate outside of the obstruction-free, virtual bounded floor plan.

FIG. 1 illustrates an electronic device 100 configured to support location-based functionality in AR or VR environments in accordance with at least one embodiment of the present disclosure. The electronic device 100 can include a portable user device, such as head mounted display (HMD), a tablet computer, computing-enabled cellular phone (e.g., a "smartphone"), a notebook computer, a personal digital assistant (PDA), a gaming console system, and the like. In other embodiments, the electronic device 100 can include a fixture device, such as medical imaging equipment, a security imaging sensor system, an industrial robot control system, a drone control system, and the like. For ease of illustration, the electronic device 100 is generally described herein in the example context of an HMD system; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 104 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging cameras 114 and 116 and a depth sensor 118 disposed at the forward-facing surface 106. In one embodiment, the imaging camera 114 is implemented as a wide-angle imaging camera having a fish-eye lens or other wide-angle lens to provide a wider-angle view of the local environment 112 facing the surface 106. The imaging camera 116 is implemented as a narrow-angle imaging camera having a typical angle of view lens to provide a narrower angle view of the local environment 112 facing the surface 106. Accordingly, the imaging camera 114 and the imaging camera 116 are also referred to herein as the "wide-angle imaging camera 114" and the "narrow-angle imaging camera 116," respectively.

The wide-angle imaging camera 114 and the narrow-angle imaging camera 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via multiview image analysis. Alternatively, a depth sensor 118 disposed on the surface 106 may be used to provide depth information for the objects in the local environment. The depth sensor 118, in one embodiment, uses a modulated light projector to project modulated light patterns from the forward-facing surface 106 into the local environment 112, and uses one or both of imaging cameras 114, 116 to capture reflections of the modulated light patterns as they reflect back from objects in the local environment 112. These modulated light patterns can be either spatially-modulated light patterns or temporally-modulated light patterns. The captured reflections of a modulated light flash are referred to herein as "depth images" or "depth imagery." The depth sensor 118 then may calculate the depths of the objects, that is, the distances of the objects from the electronic device 100, based on the analysis of the depth imagery. The resulting depth data obtained from the depth sensor 118 may be used to calibrate or otherwise augment depth information obtained from multiview analysis (e.g., stereoscopic analysis) of the image data captured by the imaging cameras 114, 116. Alternatively, the depth data from the depth sensor 118 may be used in place of depth information obtained from multiview analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 118.

One or more of the imaging cameras 114, 116 may serve other imaging functions for the electronic device 100 in addition to capturing imagery of the local environment 112. To illustrate, the imaging cameras 114, 116 may be used to support visual telemetry functionality, such as capturing imagery to support position and orientation detection. Further, in some embodiments, an imaging sensor (not shown) disposed at the user-facing surface 104 may be employed for tracking the movements of the head of the user 110 or for facial recognition, and thus providing head tracking information that may be used to adjust a view perspective of imagery presented via the display 108. The electronic device 100 also may rely on non-image information for pose detection. This non-image information can be obtained by the electronic device 100 via one or more non-image sensors (not shown in FIG. 1), such as a gyroscope or ambient light sensor. The non-image sensors also can include user interface components, such as a keypad (e.g., touchscreen or keyboard), microphone, mouse, and the like.

The electronic device 100 captures imagery of the local environment 112 via one or both of the imaging cameras 114, 116, modifies or otherwise processes the captured imagery, and provides the processed captured imagery for display on the display 108. The processing of the captured imagery can include, for example, addition of an AR overlay, conversion of the real-life content of the imagery to corresponding VR content, and the like. As shown in FIG. 1, in implementations with two imaging sensors, the imagery from the left side imaging camera 114 may be processed and displayed in left side region of the display 108 concurrent with the processing and display of the imagery from the right side imaging sensor 116 in a right side region of the display 108, thereby enabling a stereoscopic 3D display of the captured imagery.

In addition to capturing imagery of the local environment 112 for display with AR or VR modification, in at least one embodiment the electronic device 100 uses the image sensor data and the non-image sensor data to determine a relative pose (that is, position and/or orientation) of the electronic device 100, that is, a pose relative to the local environment 112. This non-image information can be obtained by the electronic device 100 via one or more non-image sensors (not shown in FIG. 1), such as a gyroscope or ambient light sensor. This relative pose information may be used by the electronic device 100 in support of simultaneous location and mapping (SLAM) functionality, visual odometry, or other location-based functionality. The non-image sensors also can include user interface components, such as a keypad (e.g., touchscreen or keyboard), microphone, mouse, and the like. The non-image sensor information representing a state of the electronic device 100 at a given point in time is referred to as the "current context" of the electronic device for that point in time. This current context can include explicit context, such as the relative rotational orientation of the electronic device 100 or the ambient light from the local environment 112 incident on the electronic device 100.

In operation, the electronic device 100 uses the image sensor data and the non-image sensor data to determine the relative pose of the electronic device 100. The relative pose information may support the generation of AR overlay information that is displayed in conjunction with the captured imagery, or in the generation of VR visual information that is displayed in representation of the captured imagery. As an example, the electronic device 100 can map the local environment 112 and then use this mapping to facilitate the user's navigation through a VR environment, such as by displaying to the user an indicator when the user navigates in proximity to and may collide with an object in the local environment.

To this end, the determination of the relative pose may be based on the detection of spatial features in image data captured by one or more of the imaging cameras 114, 116 and the determination of the pose of the electronic device 100 relative to the detected spatial features. To illustrate, in the depicted example of FIG. 1 the local environment 112 includes a bedroom that includes a first wall 122, a second wall 124, and a bed 126. The user 110 has positioned and oriented the electronic device 100 so that the imaging cameras 114, 116 capture camera image data 128 that includes these spatial features of the bedroom. In this example, the depth sensor 118 also captures depth data 132 that reflects the relative distances of these spatial features relative to the current pose of the electronic device 100. In some embodiments, a user-facing imaging camera (not shown) captures image data representing head tracking data 134 for the current pose of the head 120 of the user 110. Non-image sensor data 130, such as readings from a gyroscope, a magnetometer, an ambient light sensor, a keypad, a microphone, and the like, also is collected by the electronic device 100 in its current pose.

From this input data, the electronic device 100 can determine its relative pose without explicit absolute localization information from an external source. To illustrate, the electronic device 100 can perform multiview analysis of wide angle imaging camera image data and narrow angle imaging camera image data in the camera image data 128 to determine the distances between the electronic device 100 and the walls 122, 124 and/or the bed 126. Alternatively, the depth data 132 obtained from the depth sensor 118 can be used to determine the distances of the spatial features. From these distances the electronic device 100 can triangulate or otherwise infer its relative position in the bedroom represented by the local environment 112. As another example, the electronic device 100 can identify spatial features present in one set of captured image frames of the captured image data 128, determine the initial distances to these spatial features, and then track the changes in position and distances of these spatial features in subsequent captured imagery to determine the change in relative pose of the electronic device 100. In this approach, certain non-image sensor data, such as gyroscopic data or accelerometer data, can be used to correlate spatial features observed in one image frame with spatial features observed in a subsequent image frame. Moreover, the relative pose information obtained by the electronic device 100 can be combined with any of the camera image data 128, non-image sensor data 130, depth data 132, head tracking data 134, and/or supplemental information 136 to present a VR environment or an AR view of the local environment 112 to the user 110 via the display 108 of the electronic device 100.

To illustrate, in the depicted example of FIG. 1, the electronic device 100 can capture video imagery of a view of the local environment 112 via the imaging camera 116, determine a relative orientation/position of the electronic device 100 as described above and herein, and determine the pose of the user 110 within the bedroom. The electronic device 100 then can generate a graphical representation 138 representing, for example, a VR environment. As the electronic device 100 moves relative to the previous view, the electronic device 100 updates the graphical representation 138 so as to reflect the changed perspective. Moreover, the head tracking data 134 can be used to detect changes in the position of the head 120 of the user 110 relative to the local environment 112, in response to which the electronic device 100 can adjust the displayed graphical representation 138 so as to reflect the changed viewing angle of the user 110. Further, as described below, the electronic device 100 could present a VR environment for display to the user 110 and, in response to receiving user input of movement within the local environment 112, the electronic device 100 can update a position of the user within the VR environment. With this information, the electronic device 100 can track movement of the user 110 and update the display of the graphical representation 138 to reflect changes in the relative pose of the user 100.

As another example, the electronic device 100 can be used to facilitate navigation in VR environments in which the determination of relative pose can include, for example, bounded area designation whereby a virtual bounded floor plan (or virtual bounded volume) is generated within which the user 110 is able to move freely without colliding with spatial features of the local environment 112 (e.g., the walls 122, 124 and/or the bed 126). Those skilled in the art will recognize that the terms "virtual bounded floor plan" and "virtual bounded volume" both generally refer to virtually bounded two- and three-dimensional areas within which the user may navigate, respectively, and that the terms may be used interchangeably without departing from the scope of the disclosure.

In some embodiments, the electronic device 100 can map the local environment 112 using imaging cameras 114, 116 and/or the depth sensor 118, and then use this mapping to facilitate the user's navigation through VR environments, such as by displaying to the user a virtual bounded floor plan generated from the mapping information and information about the user's current location relative to the virtual bounded floor plan as determined from the current pose of the electronic device 100. With this information, the electronic device 100 can display notifications or other visual indications to the user 110 while navigating through a VR environment that enables the user 110 to avoid collision with objects in the local environment 112, such as by staying within the designated virtual bounded floor plan.

Figure 2:
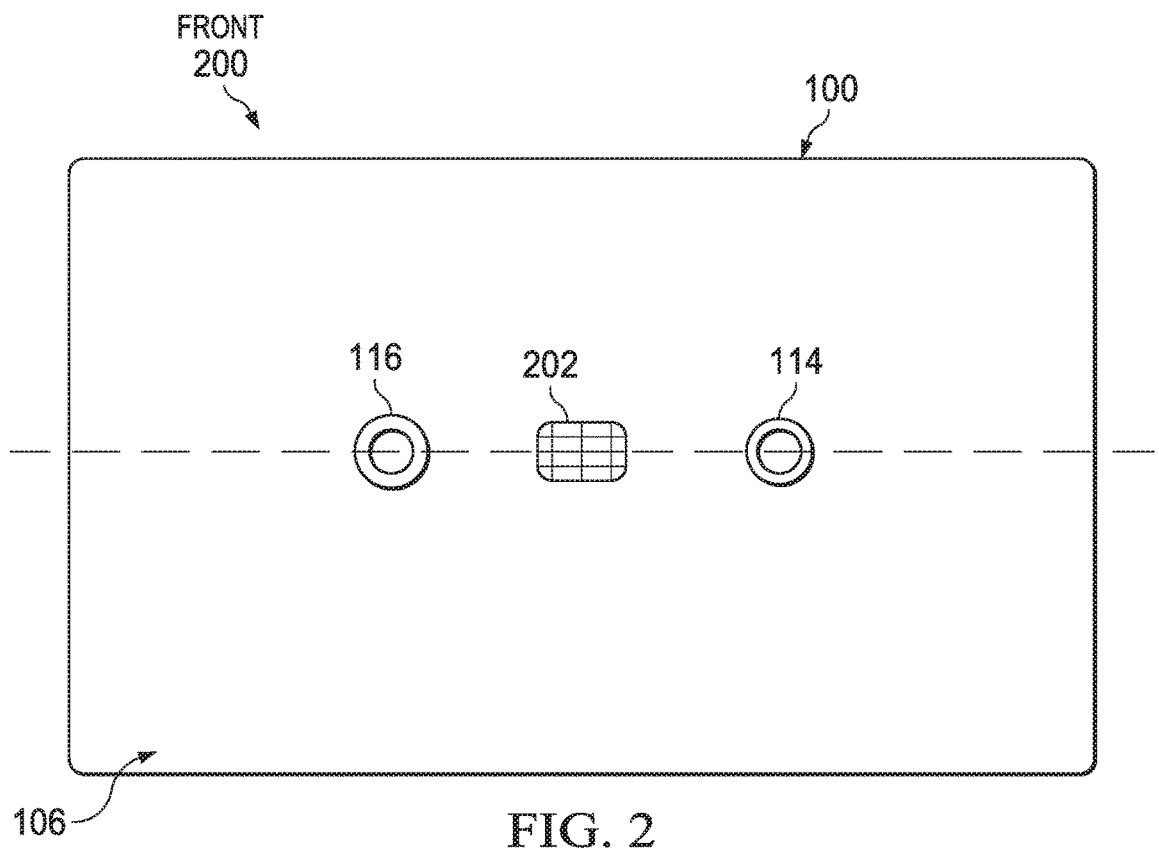
FIG. 2 is a diagram illustrating a front plan view of an electronic device implementing multiple imaging cameras and a depth sensor in accordance with at least one embodiment of the present disclosure.
Figure 3:
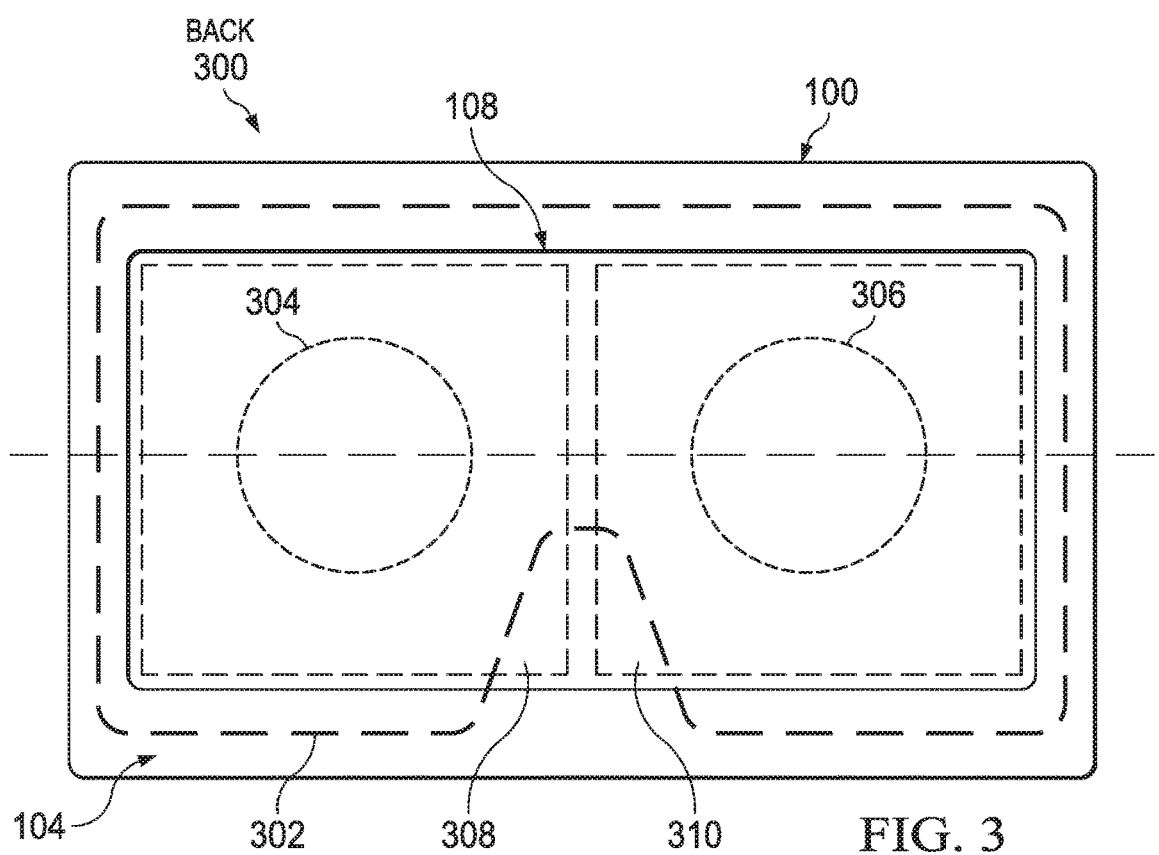
FIG. 3 is a diagram illustrating a back plan view of the electronic device of FIG. 2 in accordance with at least one embodiment of the present disclosure.

FIGS. 2 and 3 illustrate example front and back plan views of an example implementation of the electronic device 100 in a HMD form factor in accordance with at least one embodiment of the present disclosure. The electronic device 100 may be implemented in other form factors, such as a smart phone form factor, tablet form factor, a medical imaging device form factor, and the like, which implement configurations analogous to those illustrated.

As illustrated by the front plan view 200 of FIG. 2, the electronic device 100 can include the imaging cameras 114, 116, and a modulated light projector 202 of the depth sensor 118 disposed at the forward-facing surface 106. Although FIGS. 2 and 3 illustrate the imaging cameras 114, 116, and the modulated light projector 202 aligned along a straight line for the benefit of an example cross-section view in FIG. 4, in other embodiments the imaging cameras 114, 116 and the modulated light projector 202 may be offset relative to each other.

As illustrated by the back plan view 300 of FIG. 3, the electronic device 100 can include the display device 108 disposed at the surface 104, a face gasket 302 for securing the electronic device 100 to the face of the user 110 (along with the use of straps or a harness), and eyepiece lenses 304 and 306, one each for the left and right eyes of the user 110. As depicted in the back plan view 300, the eyepiece lens 304 is aligned with a left-side region 308 of the display area of the display device 108, while the eyepiece lens 306 is aligned with a right-side region 310 of the display area of the display device 108. Thus, in a stereoscopic display mode, imagery captured by the imaging camera 114 may be displayed in the left-side region 308 and viewed by the user's left eye via the eyepiece lens 304 and imagery captured by the imaging sensor 116 may be displayed in the right-side region 310 and viewed by the user's right eye via the eyepiece lens 306.

Figure 4:
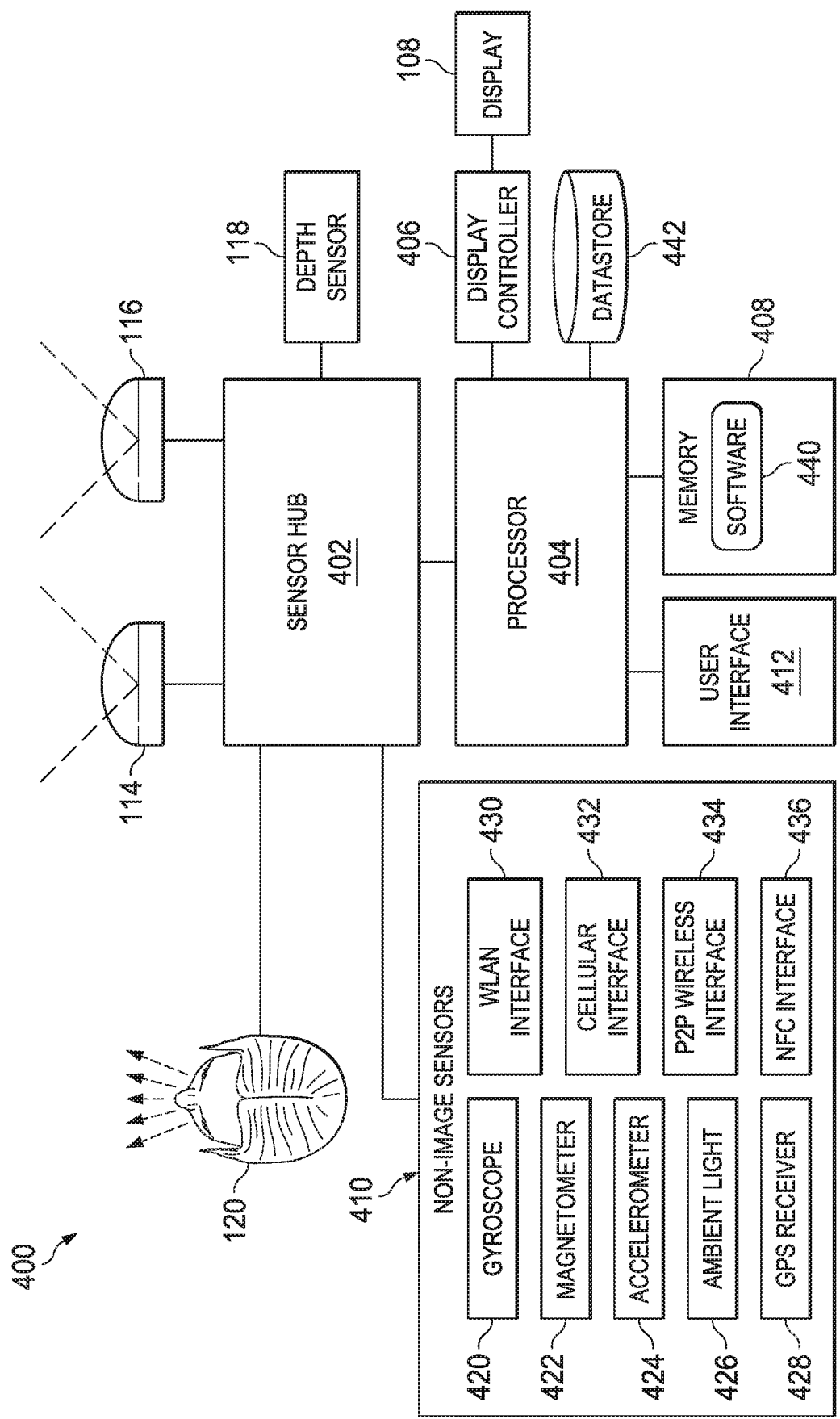
FIG. 4 illustrates an example processing system implemented by the electronic device in accordance with at least one embodiment of the present disclosure.

FIG. 4 illustrates an example processing system 400 implemented by the electronic device 100 in accordance with at least one embodiment of the present disclosure. The processing system 400 includes the display device 108, the imaging cameras 114, 116, and the depth sensor 118. The processing system 400 further includes a sensor hub 402, one or more processors 404 (e.g., a CPU, GPU, or combination thereof), a display controller 406, a system memory 408, a set 410 of non-image sensors, and a user interface 412. The user interface 412 includes one or more components manipulated by a user to provide user input to the electronic device 100, such as a touchscreen, a mouse, a keyboard, a microphone, various buttons or switches, and various haptic actuators. The set 410 of non-image sensors can include any of a variety of sensors used to provide non-image context or state of the electronic device 100. Examples of such sensors include a gyroscope 420, a magnetometer 422, an accelerometer 424, and an ambient light sensor 426. The non-image sensors further can include various wireless reception or transmission based sensors, such as a GPS receiver 428, a wireless local area network (WLAN) interface 430, a cellular interface 432, a peer-to-peer (P2P) wireless interface 434, and a near field communications (NFC) interface 436.

The electronic device 100 further has access to various datastores 442 storing information or metadata used in conjunction with its image processing, location mapping, and location-utilization processes. The datastores 442 can include a spatial feature datastore to store metadata for 2D or 3D spatial features identified from imagery captured by the imaging sensors of the electronic device 100, a SLAM datastore that stores SLAM-based information, such as mapping information for areas of the local environment 112 (FIG. 1) already explored by the electronic device 100, an AR/VR datastore that stores AR overlay information or VR information, such as representations of the relative locations of objects of interest in the local environment 112. The datastores may be local to the electronic device 100, such as on a hard drive, solid state memory, or removable storage medium (not shown), the datastores may be remotely located at one or more servers and accessible via, for example, one or more of the wireless interfaces of the electronic device 100, or the datastores may be implemented as a combination of local and remote data storage.

In operation, the imaging cameras 114, 116 capture imagery of a local environment, the compositor 402 processes the captured imagery to produce modified imagery, and the display controller 406 controls the display device 108 to display the modified imagery at the display device 108. Concurrently, the processor 404 executes one or more software programs 440 to provide various functionality in combination with the captured imagery, such spatial feature detection processes to detect spatial features in the captured imagery or in depth information captured by the depth sensor 118, the detection of the current pose of the electronic device 100 based on the detected spatial features or the non-sensor information provided by the set 410 of non-image sensors, the generation of AR overlays to be displayed in conjunction with the captured imagery, VR content to be displayed in addition to, or as a representation of the captured imagery, and the like. Examples of the operations performed by the electronic device 100 are described in greater detail below.

Figure 5:
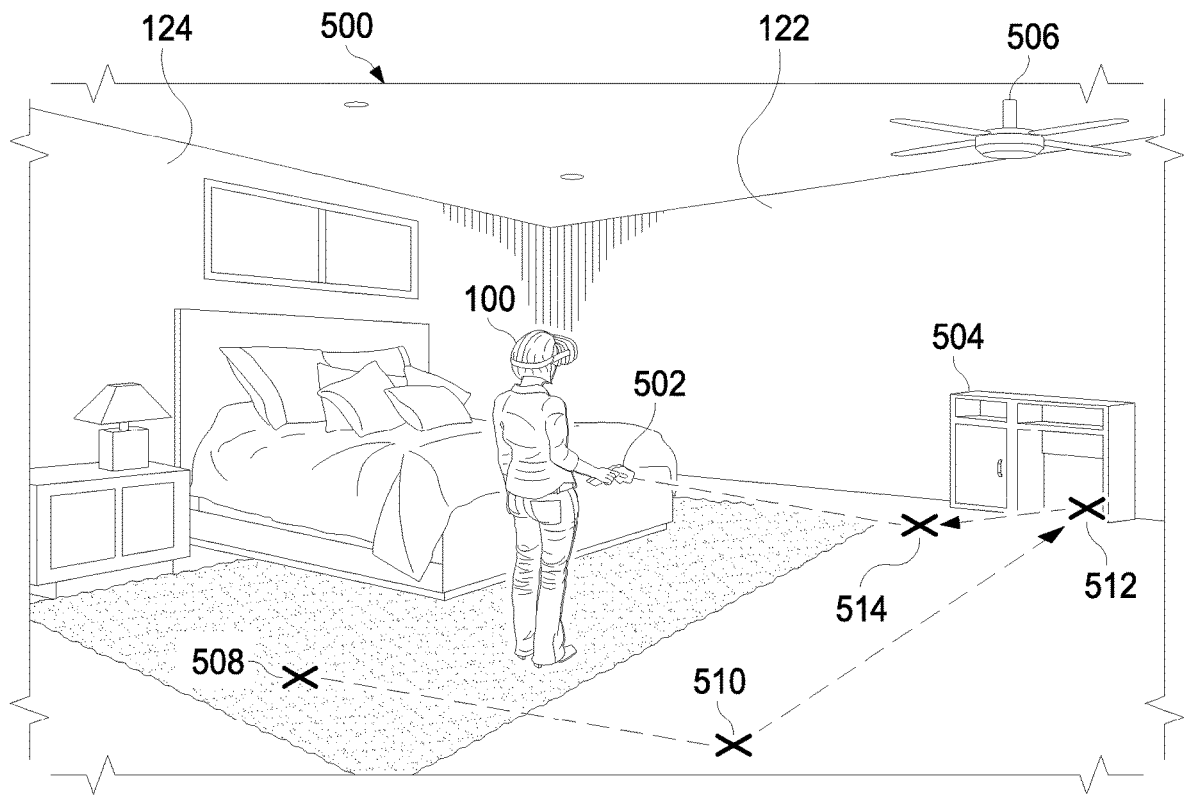
FIG. 5 is a diagram illustrating a perspective view of a first example implementation of depth sensor aided estimation of virtual bounded areas in accordance with at least one embodiment of the present disclosure.
Figure 6:
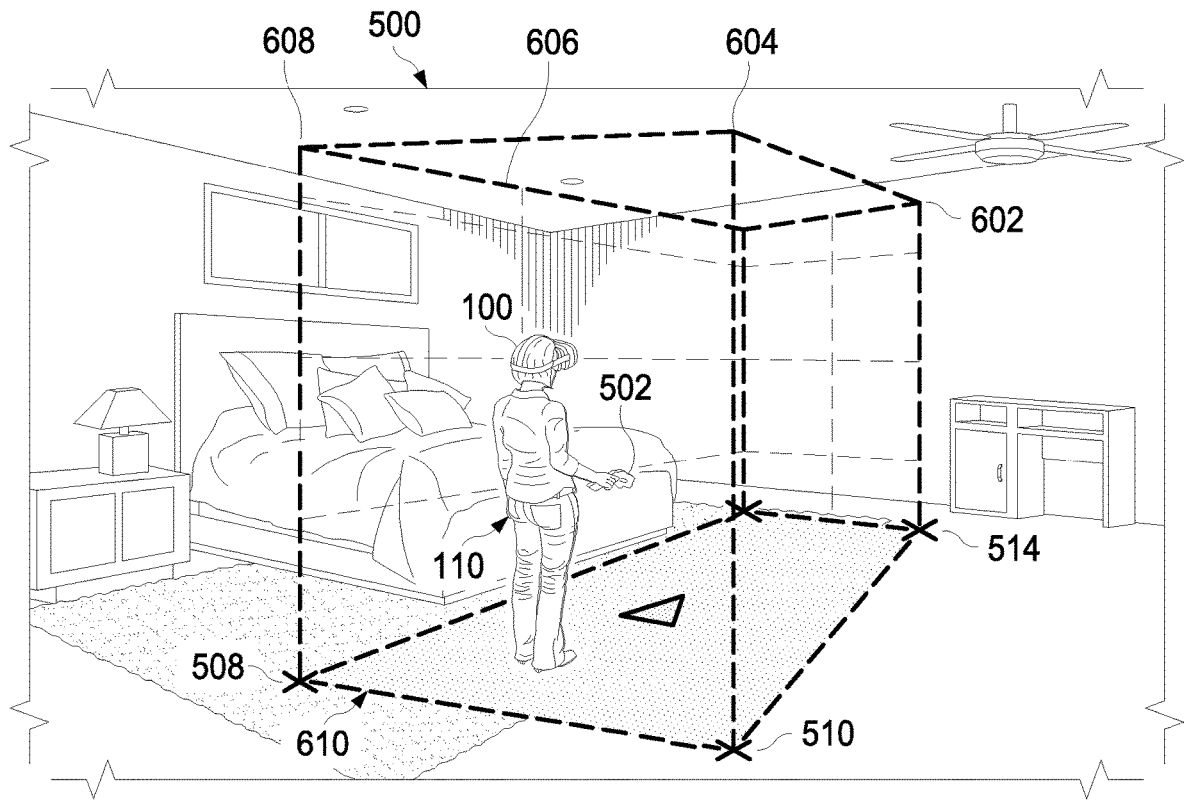
FIG. 6 is a diagram illustrating a perspective view of a second example implementation of depth sensor aided estimation of virtual bounded areas in accordance with at least one embodiment of the present disclosure.

FIGS. 5 and 6 illustrate example implementations of depth-sensor aided estimation of the boundaries of virtual bounded areas for navigation in accordance with various embodiments of the present disclosure. As illustrated in FIG. 5, the user 110 wears the electronic device 100 in a HMD form factor. In some embodiments, the electronic device 100 projects a modulated light pattern into the local environment of the bedroom 500 using depth sensor 118, which results in the reflection of light from objects in the local environment (i.e., floor, walls, and objects in bedroom 500). Because the depth, or distance, of a surface of an object from the electronic device 100 impacts the reflection of the projected light incident on the surface, the electronic device 100 can use a pattern distortion present in the reflection of the modulated light pattern to determine the depth of the object surface using any of a variety of well-known modulated light depth estimation techniques.

Alternatively, both of the forward-facing imaging cameras 114 and 116 can be used to capture the reflection of the projected modulated light pattern and multiview image analysis can be performed on the parallel captured depth imagery to determine the depths of objects in the local environment. In other embodiments, the electronic device 100 can use one or both of the forward-facing imaging cameras 114 and 116 as time-of-flight imaging cameras synchronized to the projection of the modulated light pattern, whereby the electronic device 100 calculates the depths of objects in the captured reflections using any of a variety of well-known time-of-flight depth algorithms. As yet another example, the electronic device 100 can employ a high-speed exposure shutter imaging camera (either as one of the forward-facing imaging cameras 114 and 116 or as a separate forward-facing imaging camera) that captures reflected light from a pulse of infrared light or near-infrared light, whereby the amount of reflected pulse signal collected for each pixel of the sensor corresponds to where within the depth range the pulse was reflected from, and can thus be used to calculate the distance to a corresponding point on the subject object.

In one embodiment, the electronic device 100 performs automatic estimation of bounded areas/volumes using depth information from the imaging cameras 114, 116 and depth sensor 118 to generate a two-dimensional, virtual bounded floor plan within which the user 110 may move freely without colliding into objects within bedroom 500, such as the walls 122, 124, the bed 126, the desk 504, and/or the ceiling fan 506. In some embodiments, the user also uses a hand-held controller 502 to assist in the generation of the virtual bounded floor plan. Both the electronic device 100 and the hand-held controller 502 can include sensors such as gyroscopes and altimeters so as to capture three- or six-degrees-of-freedom (6DoF) readings for enabling detection of the relative pose of the electronic device 100 and the hand-held controller 502.

In such embodiments, the electronic device 100 uses depth information to estimate the location of the bedroom floor and ceiling height to locate obstruction-free areas suitable for VR/AR use. The automatic estimation of bounded areas/volume may be performed prior to immersing the user 110 in a VR environment. Such automatic estimation of bounded areas/volumes may be accomplished by providing feedback on the display 108 of the electronic device 100 instructing the user 110 to change the pose of the electronic device 100 (e.g., directing the user 110 to stand in the middle of bedroom 500 and turn 360 degrees such that the entire room is scanned). Alternatively, the electronic device 100 may present the VR environment for display without completely scanning the bedroom 500, and continue to scan as the user 110 navigates the VR environment. In such embodiments, a warning may be displayed if the user 110 navigates into proximity of an unscanned or under-scanned portion of bedroom 500. In other embodiments, the electronic device 100 may present the VR environment for display without having scanned any portion of the bedroom 500 a priori. In such embodiments, the user 110 initiates a navigation session by picking up the electronic device 100 (i.e., wearing the HMD as illustrated) and the electronic device 100 dynamically scans the bedroom 500 as the user 110 navigates the VR environment. Additionally, the electronic device 100 may attempt to define a bounded area/volume according to a type of pose in space (e.g., standing, sitting at table, room-scale, roaming) or a size of space (e.g., dimensions for a minimum width, height, radius) required for the user 110 to navigate around in the VR environment.

The electronic device 100 begins clearing an area free of collision risks by generating a first set of initial boundary points (e.g., a first point 508, a second point 510, a third point 512, etc.) representing points where the edges of a polygonal-shaped boundary intersect. The polygon of open space defined by the generated set of initial boundary points represents a bounded area free of physical obstructions, as determined by the electronic device 100 based on depth information to estimate the location of obstruction-free areas within which the user 110 may move without colliding into objects.

In some embodiments, the electronic device 100 also detects the presence of overhanging structures, such as ceiling fan 506, that may hinder collision free navigation within the virtual bounded volume. As illustrated in FIG. 6, the electronic device 100 vertically clears the bounded area by generating a second set of initial boundary points on the ceiling (e.g., a first point 602, a second point 604, a third point 606, a fourth point 608, etc.) of the bedroom 500 in addition to the first set of initial boundary points on the floor of the bedroom 500. The points on the floor and the ceiling of the bedroom 500 are used by the electronic device 100 to define a three-dimensional (3D), virtual bounded volume (e.g., illustrated in FIG. 6 as a bounded cage 610) within which the user 110 may move without colliding into objects. The bounded cage 610 defines an area free of physical obstructions and/or overhanging structures (e.g., no ceiling fans that the user 110 may accidentally collide into with outstretched arms).

In some embodiments, subsequent to generating the first set of initial boundary points, the electronic device 100 allows for user modification of the initial points to refine or adjust boundaries of the virtual bounded volume. Referring now back to FIG. 5, the initial third point 512 generated by the electronic device 100 is positioned too close to the desk 504 such that the user 110 is likely to collide with the desk 504 if the user 110 walks close to or past the boundary of the virtual bounded area/volume. Accordingly, the user 110 can use the hand-held controller 502 to reposition the third point 512 to the modified position 514. In some embodiments, while wearing the HMD, the display 108 of the electronic device 100 presents a live visualization of the bedroom 500 to the user 110, which also includes displaying the set of initial boundary points 508-512 on the display 108.

The user 110 repositions the third point 512 by pointing the hand-held controller 502 at the floor of the bedroom 500 and selecting the desired point to be moved (e.g., the third point 512, etc.). For example, in some embodiments, the user 110 clicks and drags the third point 512 to the modified position 514 using the hand-held controller 502. Although the example of FIG. 5 illustrates user modification of boundary points using the hand-held controller 502 together with depth sensors on a HMD, those skilled in the art will recognize that user selection and movement of the boundary points may be performed using various other techniques. For example, in other examples, the user selection may be performed using a handheld depth camera (not shown). With handheld depth cameras, the user 110 may tap on the screen or point the center of the device at a location on the floor to designate the location of polygonal points. In another example, the user 110 may walk around the cleared area and a physical position of the user 110 within the bedroom 500 is used to determine and mark the perimeter of the cleared area on the floor or virtual bounded volume 610.

FIG. 7 illustrates an example method 700 of operation of the electronic device 100 for generating virtual bounded floor plans and/or volumes in accordance with at least one embodiment of the present disclosure. For ease of illustration, the method 700 is depicted and generally described as a single loop of operations that can be performed multiple times. It is understood that the steps of the depicted flowchart of FIG. 7 can be performed in any order, and certain ones can be eliminated, and/or certain other ones can be added or repeated depending upon the implementation.

An iteration of method 700 initiates with the capture of various image sensor data, non-image sensor data, and depth data at block 702. In one embodiment, the capture of the sensor data is triggered by, or otherwise synchronized to, the capture of concurrent image frames by one or more of the imaging cameras 114, 116, and depth sensor 118 (FIG. 1) of the electronic device 100. In other embodiments, various sensor data may be periodically or otherwise repeatedly obtained and then synchronized to captured image data using timestamps or other synchronization metadata. This capture of sensor data can include the capture of wide angle view image data for the local environment 112 (FIG. 1) via the wide-angle imaging camera 114 at block 702 and the capture of narrow angle view image data for the local environment 112 via the narrow-angle imaging camera 116. Further, in the event that the depth sensor 118 is activated, depth data for the local environment can be captured via the depth sensor 118. Furthermore, head tracking data representing the current position of the user's head 120 can be obtained from a user-facing imaging camera.

At block 704, the various image sensor data, non-image sensor data, and depth data captured from block 702 is used by the electronic device 100 to generate a mapping of the local environment surrounding the electronic device 100. As described above, the depth sensor relies on the projection of a modulated light pattern, or a "modulated light flash," by the modulated light projector 124 into the local environment and on the capture of the reflection of the modulated light pattern therefrom by one or more of the imaging cameras. Thus, the HMD (i.e., electronic device 100 as illustrated in FIGS. 5-6) worn by the user may use one or both of the forward-facing imaging cameras 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding spatial feature, the HMD can perform a spatial feature analysis on the depth imagery to determine a spatial feature and its relative depth, and then attempt to match the spatial feature to a corresponding spatial feature identified in the visual-light imagery captured at or near the same time as the reflected modulated light imagery was captured. In another embodiment, the HMD can capture a visible-light image, and thereafter control the modulated light projector to project a modulated light pattern and capture a reflected modulated light image. The HMD then can develop a depth map for the visible-light image from the reflected modulated light image as they effectively represent the same scene with the same spatial features at the same coordinates due to the contemporaneous capture of the visible-light image and the reflected modulated light image. In some embodiments, generating the mapping includes using the depth data for generating a dense visual map of the local environment, such as dense 3D point cloud maps. In some embodiments, generating the mapping can also include generating a sparse visual map of the local environment, thereby providing mapping of a lower-density than the dense visual map that is computationally easier to generate and uses less storage space.

At block 706, the electronic device 100 receives outer boundary data representative of the outer boundaries of an obstruction-free, virtual bounded area/volume. In one embodiment, as described above relative to FIGS. 5-6, the outer boundary data is provided as a set of initial boundary points via depth sensing performed by the electronic device 100 to estimate the locations of the floor, the ceiling, overhanging structures, and objects within the local environment. The outer boundary data is provided via automatic estimation of bounded areas using depth information from the imaging cameras 114, 116 and depth sensor 118. In such embodiments, the HMD uses depth information to estimate the location of objects in the local environment and generate a set of initial boundary points to locate obstruction-free areas suitable for VR/AR use without user-input of selecting polygonal points on the floor or ceiling. The automatic estimation of outer boundary data may be performed prior to immersing the user in a VR environment or dynamically in real time during a navigation session.

At optional block 708, the electronic device 100 receives modified outer boundary data representative of the outer boundaries of an obstruction-free, virtual bounded area/volume. The user is not required to perform this optional repositioning of the initial boundary points and can instead proceed directly from block 706 to block 710 by accepting the initial boundary points as generated in block 706. In one embodiment, as described above relative to FIGS. 5-6, the modified outer boundary data is provided as a user-modification or annotation of points on the boundaries of a virtual bounded area that allows for user modification of the initial points to refine or adjust boundaries of the virtual bounded area/volume. For example, user-modification of boundary points can include pointing a hand-held controller at the floor of the local environment for selecting and repositioning at least one of the initial boundary points generated at block 706 (e.g., at least one of the first set of initial boundary points 508-512 or at least one of the second set of initial boundary points 602-608). In another embodiment, instead of wearing a HMD, the user holds a hand-held depth camera and taps on the screen or points the center of the handheld depth camera at a location on the floor of the local environment to select and reposition polygonal points.

At block 710, the electronic device 100 generates a virtual bounded floor plan using the outer boundary data of blocks 706 and/or 708. The polygon of open space defined by the outer boundary data represents a bounded area free of physical obstructions. For example, the points on the floor and the ceiling of the local environment provided via user-annotation are used to define a 3D bounded volume (e.g., bounded volume cage of FIG. 6) within which the user may move without colliding into objects. Various techniques implementable by the processing system 100 for providing location-based functionality and navigation using virtual bounded floor plans are described below with reference to FIGS. 8-12.

Figure 8A:
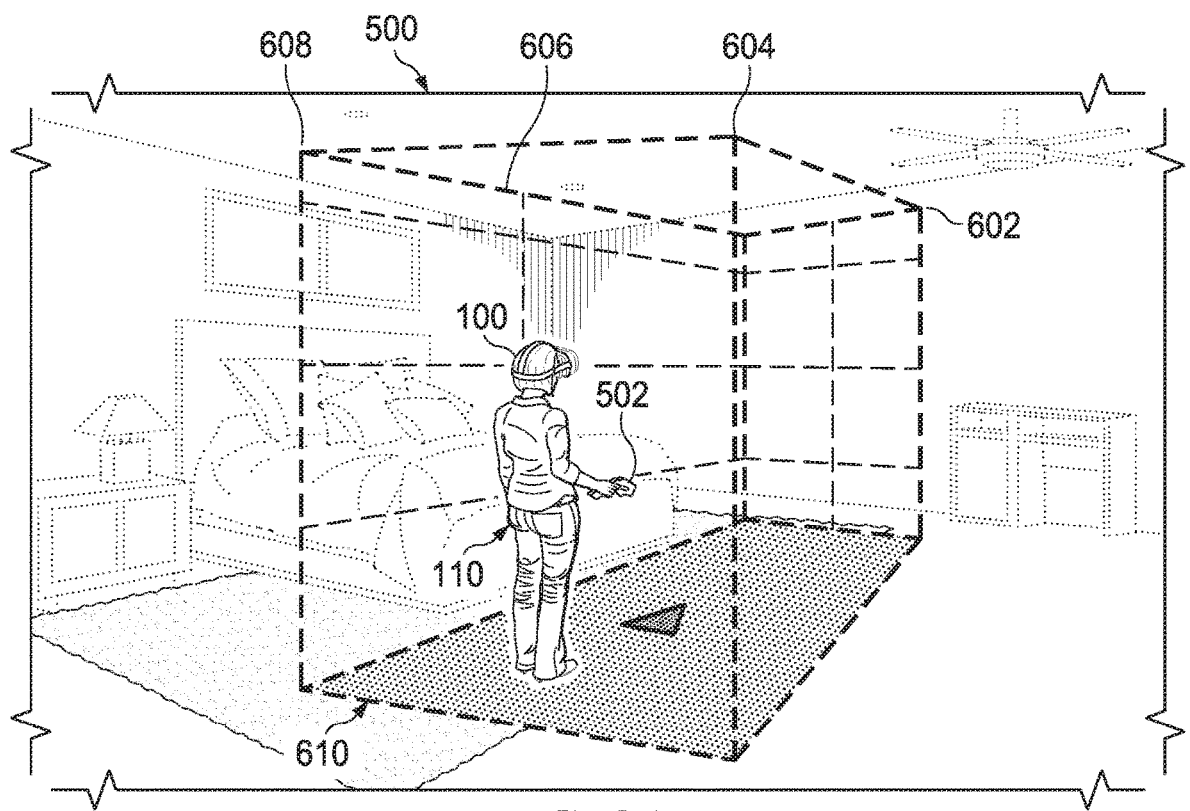
FIG. 8A is a block diagram illustrating a perspective view of a first example implementation of navigating virtual bounded areas in accordance with at least one embodiment of the present disclosure.

FIGS. 8A-12 illustrate example implementations for providing VR collision warnings based on the virtual bounded floor plans in accordance with various embodiments of the present disclosure. As illustrated in FIG. 8A, the user 110 wears the electronic device 100 in a HMD form factor for navigation within virtual bounded floor plan 800 (e.g., virtual bounded floor area/volume discussed in relation to FIGS. 5-7). As previously described, the virtual bounded floor plan 800 is a virtual space aligned to the physical geometry of the local environment (i.e., bedroom 500) using point cloud data of the electronic device's depth sensors. The virtual bounded floor plan 800 stores information about obstruction-free floor areas for standing, room-scale, or roaming in VR.

As discussed above, the electronic device 100 captures sensor data from one or more non-image sensors and depth sensors. To this end, the electronic device 100 can implement any of a variety of non-image sensors to facilitate the determination of the relative pose of the electronic device 100. Such non-image sensors can include one or more of a gyroscope, an accelerometer, a magnetometer, an altimeter, and a gravity gradiometer that provide explicit information pertaining to the relative position, orientation, or velocity of the electronic device 100 within virtual bounded floor plan 800 and bedroom 500. With the spatial features identified in the captured imagery of bedroom 500, the electronic device 100 determines or updates its current relative pose based on an analysis of the spatial features. For example, in one embodiment, the electronic device 100 implements a visual odometry-based position/orientation detection process whereby the electronic device 100 determines its new pose relative to its previously determined pose based on the shifts in positions of the same spatial features between current captured imagery and previously-captured imagery in a process commonly referred to as "optical flow estimation," Example algorithms for optical flow estimation includes the well-known Lucas-Kanade method, as well as template-based approaches or feature descriptor matching-based approaches.

In other embodiments, the electronic device 100 utilizes its current context to aid the determination of the current pose. In some implementations, the current context is used to verify or refine a pose reading originally determined through imagery analysis. To illustrate, the electronic device 100 may determine an orientation reading from the imagery analysis and then use the most recent 6DoF reading from a gyroscope sensor to verify the accuracy of the image-based orientation reading.

The electronic device 100 can also utilize simultaneous localization and mapping (SLAM) algorithms to both map the local bedroom environment and determine its relative location within the mapped environment without a priori knowledge of the local environment. The SLAM algorithms can use multiple iterations of the pose determination over time to generate a map of the bedroom 500 while concurrently determining and updating the pose of the electronic device 100 at each appropriate point in time. In some embodiments, the electronic device 100 may maintain estimates of the global, or absolute, pose of spatial features identified in the local environment 112. To this end, the electronic device 100 may use location estimations of spatial features using non-image sensor data representative of global pose information, such as sensor data captured from a GPS receiver, a magnetometer, gyrocompass, and the like. This pose information may be used to determine the position/orientation of the electronic device 100, and from this information, the electronic device 100 can estimate the position/orientations of identified spatial features based on their positions/orientations relative to the electronic device 100. The electronic device 100 then may store or update this estimated position/orientation for a spatial feature as metadata associated with the spatial feature. This mapping information can be utilized by the electronic device 100 to support any of a variety of location-based functionality, such as use in providing collision warnings, as described in greater detail below.

The view perspective presented on the display of the electronic device 100 often may be dependent on the particular pose of the electronic device 100 within virtual bounded floor plan 800. For example, depth sensor data and the boundaries of the virtual bounded areas are nominally hidden from the user while navigating in VR environments to preserve VR immersion, but may be selectively displayed to the user to assist in avoiding collisions with obstructions in the physical space (i.e., bedroom 500). Assuming the electronic device 100 has mapped the local environment of bedroom 500, the electronic device 100 can use the current position of the electronic device 100 relative to this mapping to determine whether the user remains navigating within the virtual bounded floor plan 800 that was previously cleared of obstructions.

As illustrated in FIG. 8A, as the user (and the electronic device 100) approaches the boundaries of the virtual bounded floor plan 800, the electronic device 100 can update the graphics user interface (GUI) presented for display to begin overlaying a bounded cage 610 visible to the user 110. Accordingly, the bounded cage 610 is overlaid over the display of a VR or AR application executing at the electronic device 100 to warn the user that he/she is in danger of leaving the obstruction-free virtual bounded floor plan 800 (and therefore may collide with physical objects in bedroom 500). In some embodiments, as the user moves the electronic device 100 around the bedroom 500 and navigates close to the edge of the virtual bounded floor plan 800, the presented image changes to fade out display of the VR environment and fade in display of the bounded cage 610. As the user 110 navigates further away from the virtual bounded floor plan 800, display of the VR environment further fades out further based on a distance that the user 110 navigates away from the virtual bounded floor plan 800.

Figure 8B:
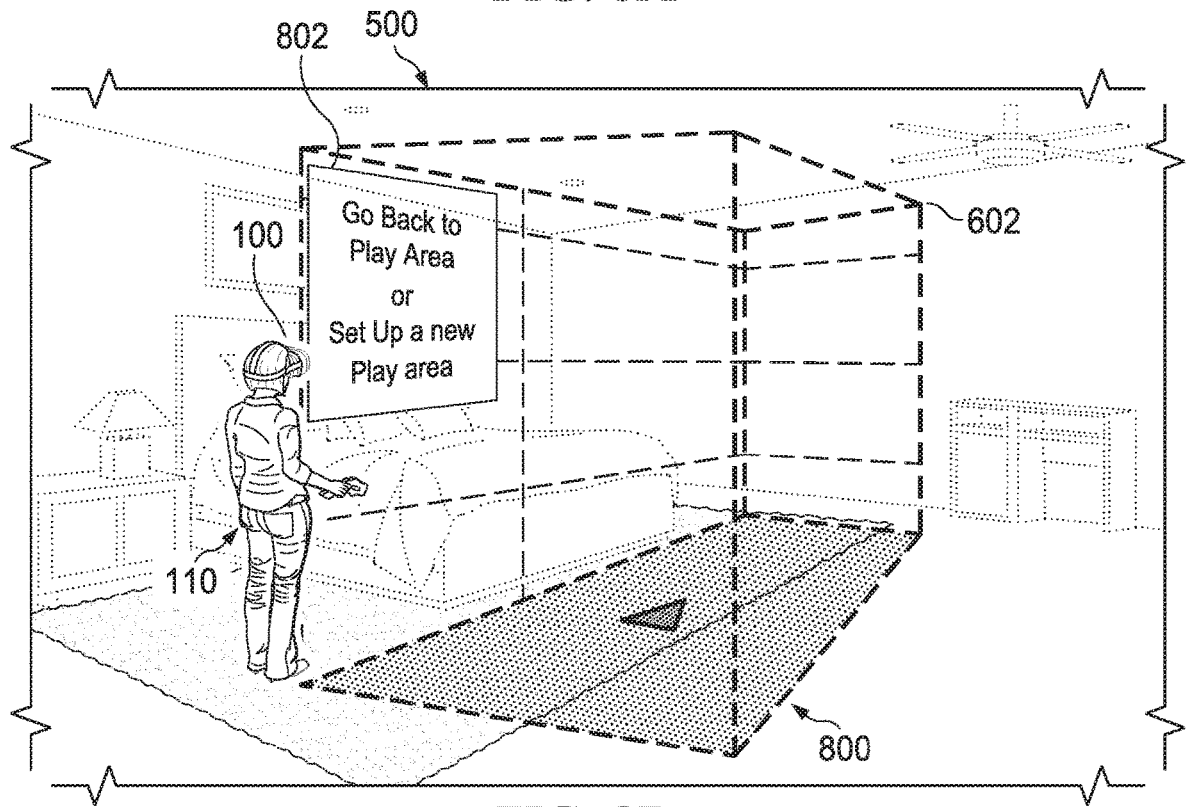
FIG. 8B is a block diagram illustrating a perspective view of a second example implementation of navigating virtual bounded areas in accordance with at least one embodiment of the present disclosure.

In some embodiments, if the user 110 navigates too far away from the virtual bounded floor plan 800 (based on a predetermined distance), VR immersion breaks to prevent collision with physical objects. As illustrated in FIG. 8B, the user 110 has navigated outside of the virtual bounded floor plan 800. In this particular illustration, navigating forward would result in the user 110 colliding with the bed 126. Accordingly, display of the VR environment is paused (i.e., no longer rendered for display in any form, faded or not, on the display of device 100) and a warning 802 (e.g., "Go Back to Play Area" message) is displayed to encourage the user 110 to return to the virtual bounded floor plan 800. This restricts navigation of VR environments to areas which have already been verified to be clear of collision risks. In some embodiments, the user 110 is prompted by the electronic device 100 to generate a new virtual bounded floor plan or volume each time the user 110 enters into an area that has not been previously cleared or has been under-scanned for collision risks, such as when entering a new room or a portion of a room that has not been scanned (e.g., the portion of bedroom 500 behind user 110 in FIG. 8B).

Figure 9:
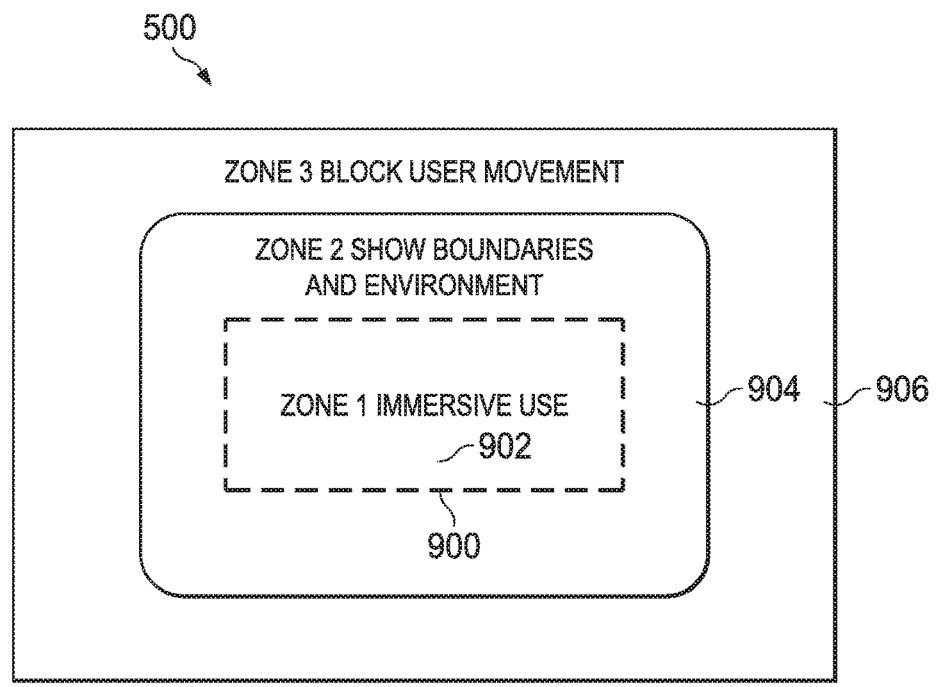
FIG. 9 is a diagram illustrating a top down view of a virtual bounded floor plan in accordance with at least one embodiment of the present disclosure.

FIG. 9 is a diagram illustrating a top down view of a virtual bounded floor plan in accordance with various embodiments. As illustrated, boundary 900 represents the outer boundary of a virtual bounded area, such as the bounded cage 610 of FIGS. 6 and 8A-8B. While the user 110 is located within boundary 900 in the first zone 902, such as illustrated in FIG. 6, the electronic device 100 renders a VR environment for display but does not display the boundaries of the bounded cage 610. Further, the display of a point cloud map for nearby objects and/or user-initiated depth camera passthrough (described in more detail below) is enabled while the user is located in the first zone 902. If the user navigates to the second zone 904 just outside the boundary 900, such as illustrated in FIG. 8A, the electronic device 100 changes the images presented for display by fading out display of the VR environment and fading in display of a point cloud representation of the floor and the bounded cage 610 boundaries. However, if the user 110 navigates too far away from the virtual bounded area, such as illustrated in FIG. 8B, VR immersion breaks to prevent collision with physical objects. While the user is located within the third zone 906, the electronic device 100 ceases rendering of the VR environment. In some embodiments, the electronic device 100 only displays the point cloud representation of the floor and the bounded cage 610 boundaries if the user 110 is facing in the direction of the first zone 902. In other embodiments, the electronic device 100 displays a prompt instructing the user 110 to return to the first zone 902 or generate a new virtual bounded area free of collision risks. In other embodiments, when the user 110 navigates out of the first zone 902, the electronic device 100 enters a free roam mode in which the electronic 100 maintains rendering of the VR environment but further overlays display showing, for example, point cloud representations of objects (or alternatively, live imagery of objects via pass through cameras) around the user 110. Accordingly, a mixed reality/AR experience is presented such that the user 110 is able to safely in, for example, the second zone 904, the third zone 906, or beyond without needing to remove the HMD (i.e., electronic device 100).

FIG. 10 illustrates an example method 1000 of operation of the electronic device 100 for providing collision warnings in accordance with at least one embodiment of the present disclosure. For ease of illustration, the method 1000 is depicted and generally described as a single loop of operations that can be performed multiple times. It is understood that the steps of the depicted flowchart of FIG. 10 can be performed in any order, and certain ones can be eliminated, and/or certain other ones can be added or repeated depending upon the implementation.

An iteration of method 1000 initiates with determining a current pose of the electronic device 100 at block 1002. To this end, the electronic device 100 initiates the reading of one or more of the image and/or non-image sensors and uses the resulting sensor data to specify one or more parameters of the current pose (i.e., relative position and/or orientation) of the electronic device 100. This can include, for example, specifying the 6DoF orientation of the electronic device 100 at the time an image was captured, specifying GPS coordinates of the electronic device 100, and the like. The electronic device 100 provides this current context information for storage as metadata associated with the spatial features identified in the bedroom 500. The current pose of the electronic device 100 may also be determined through through the application of a visual odometry algorithm.

At block 1004, the method 1000 continues by determining whether the current pose of the electronic device 100 indicates that the user 110 is in risk of colliding with physical objects. If the current pose of the electronic device 100 indicates that the user is within but approaching a boundary the virtual bounded floor plan 800, the method 1000 proceeds from block 1004 to block 1006. At block 1006, the electronic device 100 modifies the display rendering of the VR environment to overlay the boundaries of a virtual bounded floor plan to be visible to the user. Accordingly, the boundaries of the virtual bounded floor plan is overlaid over the display of a VR or AR application executing at the electronic device 100 to warn the user that he/she is in danger of leaving the obstruction-free virtual bounded floor plan 800 (and therefore may collide with physical objects in bedroom 500). In some embodiments, as the user moves the electronic device 100 around the bedroom 500 and navigates close to the edge of the virtual bounded floor plan 800, the display rendering of the VR environment changes to fade out display of the VR environment and fade in display of the floor of the local environment and boundaries of the virtual bounded floor plan. As the user 110 navigates further away from the virtual bounded floor plan 800, display of the VR environment further fades out further based on a distance that the user 110 navigates away from the virtual bounded floor plan 800.

If the current pose of the electronic device 100 indicates that the user has navigated outside a boundary of the virtual bounded floor plan 800, the method 1000 proceeds from block 1004 to block 1008. At block 1008, the electronic device 100 pauses rendering of the VR environment to break VR immersion and display a warning to the user to prevent collision with physical objects. As previously discussed relative to FIGS. 8B and 9, the user 110 has navigated outside of the virtual bounded floor plan 800 and navigating forward would result in the user 110 colliding with the bed 126. Accordingly, display of the VR environment is paused (i.e., no longer rendered for display in any form, faded or not, on the display of device 100) and a warning 802 (e.g., "Go Back to Play Area" message) is displayed to encourage the user 110 to return to the virtual bounded floor plan 800. In some embodiments, the warning 802 can request the user 110 to return to the virtual bounded floor plan 800. In other embodiments, the warning 802 can request the user 110 to begin the process of clearing a new virtual bounded floor plan (e.g., repeat the steps of FIG. 7).

Those skilled in the art will recognize that the virtual bounded floor plans, such as previously discussed relative to FIGS. 5-10, may have been properly automatically defined by depth sensors of the electronic device 100 at initial setup/generation of the virtual bounded floor plan (e.g., as described relative to FIGS. 5-7) to be free of obstructions. However, it is not guaranteed that the virtual bounded floor plans will remain obstruction-free over time. For example, the local environment 112 may change if furniture is moved into the physical space aligned to the virtual bounded floor plan 800, if a pet wanders into the physical space aligned to the virtual bounded floor plan 800, etc.

Accordingly, in some embodiments, the depth sensor 118 of the electronic device 100 periodically scans the local environment 112 surrounding the user 110 to detect objects within the user's collision range. This periodic scanning is performed even while the relative pose of device 100 indicates user 110 to be positioned within a virtual bounded floor plan such as to detect new objects or obstructions that may have been introduced into the physical space aligned to the virtual bounded floor plan after initial obstruction clearance.

Figure 11:
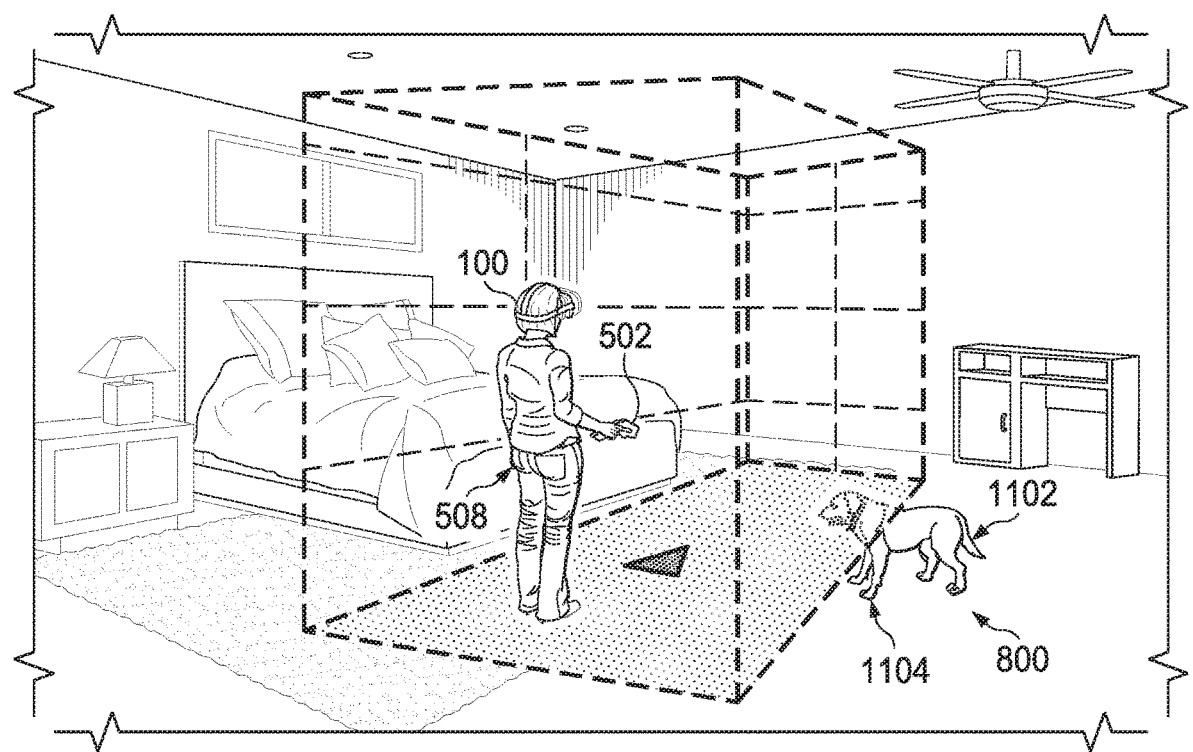
FIG. 11 is a diagram illustrating a perspective view of a collision warning presented to users in accordance with at least one embodiment of the present disclosure.

FIG. 11 is a diagram illustrating a perspective view of a collision warning presented to users in accordance with at least one embodiment of the present disclosure. A depth sensor 118 of the electronic device 100 periodically scans the local environment and generates warnings to the user after detecting physical objects which obstruct at least a portion of the area within the virtual bounded floor plan 800. After detecting the presence of an unmapped object within the virtual bounded floor plan 800 (e.g., the dog 1102), the electronic device 100 displays a collision warning 1104 overlaid the VR environment rendering. As illustrated, the collision warning 1104 is presented as a point cloud representation of the dog 1102. The collision warning 1104 allows the user 110 to remain immersed within the VR environment while further providing warnings regarding collision risks. Although the collision warning 1104 is presented as a point cloud outline of the obstruction in FIG. 11 (i.e., point cloud outline of the dog 1102), those skilled in the art will recognize that various GUI implementations may be presented to the user 110 without departing from the scope of this disclosure. For example, in other embodiments, the collision warning may be presented as a pixelated-area of the display colored to be in stark contrast with colors of the VR environment rendering. In other embodiments, the collision warning may be presented as an actual image of the physical object as captured by one of imaging cameras 114, 116 that is overlaid the VR environment rendering.

In many instances, continual activation of the depth sensor 118 can consume a significant amount of power. This can make the depth sensor 118 a relatively high-powered device, with the power consumed by the depth sensor 118 in this manner being significantly greater than the power consumed by the typical display used in a tablet, smartphone, or other portable user device. This can negatively impact the run time of the electronic device 100 between battery recharges. Accordingly, methods for efficient operation of the depth sensor 118 would improve performance of the electronic device 100.

As noted above, the electronic device 100 cycles through iterations of the methods 700 and 1000 to provide real-time, updated localization, mapping, and virtual reality display. However, these sub-processes do not necessarily need to be performed continuously. To illustrate, the electronic device 100 may have developed depth data for objects in the bedroom 500 the first time the user enters the bedroom 500 with the electronic device 100. As furniture in the bedroom 500 does not regularly get rearranged, it would be energy and computationally inefficient to iterate through the virtual bounded floor plan generation of method 700 and the collision warning generation method 1000.

Accordingly, rather than operating the depth sensor 118 to continually scan the local environment, in some embodiments, the potential for change in the arrangement of objects in a given local environment can be addressed through an automatic periodic depth data recapture triggered by a lapse of a timer so as to refresh or update the depth data for the area. The electronic device 100 also can gauge its current familiarity with the local environment 112 by evaluating the geometric uncertainty present in imagery captured from the local environment 112. This geometric uncertainty is reflected in, for example, the detection of previously-unencountered objects or geometry, such as a set of edges that were not present in previous imagery captured at the same or similar pose, or the detection of an unexpected geometry, such as the shift in the spatial positioning of a set of corners from their previous positioning in an earlier-captured image from the same or similar device pose.

To this end, in one embodiment the electronic device 100 catalogs the spatial features detected within the local environment 112. This catalog of features can include a list of spatial features, along with certain characteristics, such as their relative positions/orientations, their dimensions, etc. Because the local environment 112 may change with respect to the same location (e.g., objects may be added or removed, or moved to new positions), the electronic device 100 can determine whether it is in an environment with rearranged physical objects by identifying the spatial features currently observable from the location and comparing the identified spatial features with the spatial features previously cataloged for the location. In some instances, the electronic device 100 may be in an area for which it has previously developed sufficient depth data (e.g., bedroom 500), but changes in the local environment have since occurred and thus made the previous depth data unreliable. For example, the depth data for the bedroom 500 becomes stale after furniture and fixtures get rearranged. Accordingly, the electronic device 100 would iterate through the method 700 to remap and generate a new virtual bounded floor plan.

In some embodiments, the electronic device 100 may lower the operating frequency of the depth sensor 118 to improve power efficiency, and periodically scan the local environment to determine whether any unexpected spatial features show up in a previously cleared, obstruction-free virtual bounded area. Upon detecting unexpected spatial features, such as an unmapped object appearing in the field of view of one of the imaging cameras 114, 116 or depth sensor 118, the electronic device 100 increases the operating frequency of the depth sensor 118 to map the spatial features of the unmapped object and/or until the unmapped object leaves the field of view of the imaging cameras 114, 116 or depth sensor 118.

Additionally, in some embodiments, the electronic device 100 adjusts the use frequency of its sensors (e.g., imaging cameras 114, 116 and/or depth sensor 118) based on non-image sensor data 130, such as gyroscope or accelerometer data. In some embodiments, user velocity and acceleration data may be combined with depth data representing distance to objects or distance to leaving the bounded areas in determining which sensors to use, how often to use such sensors, and at what frequencies. For example, if the user 110 is running around at high speeds near the boundaries of the bounded area, such as based on velocity information gathered by accelerometers of the electronic device 100 or hand-held controller 502, the electronic device 100 may ramp up the frequency of data gathering operations from all its sensors to provide faster access to more data due to increased collision risks. Conversely, if the user 110 stands still close to the center of the bounded area, the electronic device 100 may ramp down the frequency of data gathering operations from one or more of its sensors to conserve energy due to decreased risks that the user 110 will collide with objects in the real world.

FIG. 12 illustrates an example method 1200 of operation of the electronic device 100 for providing collision warnings for unexpected objects while immersed in a VR environment in accordance with at least one embodiment of the present disclosure. For ease of illustration, the method 1200 is depicted and generally described as a single loop of operations that can be performed multiple times. It is understood that the steps of the depicted flowchart of FIG. 12 can be performed in any order, and certain ones can be eliminated, and/or certain other ones can be added or repeated depending upon the implementation.

An iteration of method 1200 initiates at block 1202 with the electronic device 100 receiving sensor and boundary data to generate a virtual bounded floor plan, such as previously discussed in more detail with regards to FIGS. 5-7. In some embodiments, the sensor data includes data from the capture of wide angle view image data for the local environment 112 (FIG. 1) via the wide-angle imaging camera 114 and the capture of narrow angle view image data for the local environment 112 via the narrow-angle imaging camera 116. Further, in the event that the depth sensor 118 is activated, the sensor data includes depth data for the local environment captured via the depth sensor 118. The various sensor data is used to generate a mapping of the local environment surrounding the electronic device 100. In some embodiments, generating the mapping includes using the depth data for generating a dense visual map of the local environment, such as dense 3D point cloud maps. In some embodiments, generating the mapping can also include generating a sparse visual map of the local environment, thereby providing mapping of a lower-density than the dense visual map that is computationally easier to generate and uses less storage space.

Additionally, the electronic device 100 receives boundary data representative of the outer boundaries of an obstruction-free, virtual bounded floor plan. In one embodiment, as described above relative to FIGS. 5-7, the outer boundary data is provided via automatic estimation of bounded areas using depth information from the imaging cameras 114, 116 and depth sensor 118. In such embodiments, the electronic device 100 uses depth information to estimate the location of the local environment floor and ceiling height to locate obstruction-free areas suitable for VR/AR use without user-input of selecting outer boundary points. The automatic estimation of outer boundary data may be performed prior to immersing the user in a VR environment.

At block 1204, the electronic device 100 periodically scans the local environment to determine whether any unexpected spatial features show up in the previously cleared, obstruction-free virtual bounded floor plan of block 1202. In some embodiments, the unexpected spatial feature is detected by depth sensor 118, which senses an unmapped object via depth data not initially captured during the mapping operations of block 1202. In other embodiments, the unexpected spatial feature is detected by one of the imaging cameras 114, 116, which captures imagery and gauge a current familiarity of the local environment 112 by evaluating geometric uncertainty present in imagery captured from the local environment 112. This geometric uncertainty is reflected in, for example, the detection of previously-unencountered objects or geometry, such as a set of edges that were not present in previous imagery captured at the same or similar pose, or the detection of an unexpected geometry, such as the shift in the spatial positioning of a set of corners from their previous positioning in an earlier-captured image from the same or similar device pose.

At block 1206, the electronic device 100 generates warnings to be displayed to the user after detecting physical objects which obstruct at least a portion of the area within the virtual bounded floor plan of block 1202. In one embodiment, the collision warning is presented as a point cloud outline of the obstruction, such as previously described relative to FIG. 11. In another embodiment, the collision warning may be presented as a pixelated-area of the display colored to be in stark contrast with colors of the VR environment rendering. In other embodiments, the collision warning may be presented as an actual image or live video of the physical object as captured by one of imaging cameras 114, 116 that is overlaid the VR environment rendering.

In some embodiments, method 1200 optionally includes changing the operating frequency of the electronic device's depth sensor in response to detecting physical objects which obstruct at least a portion of the area within the virtual bounded floor plan. For example, in one embodiment, upon detecting unexpected spatial features, such as an unmapped object appearing in the field of view of the depth sensor, the electronic device 100 increases the operating frequency of the depth sensor to map the spatial features of the unmapped object and/or until the unmapped object leaves the field of view of the depth sensor, thereby allowing the electronic device 100 to conserve power by operating at lower frequencies while the virtual bounded floor plan remains obstruction-free.

Figure 13:
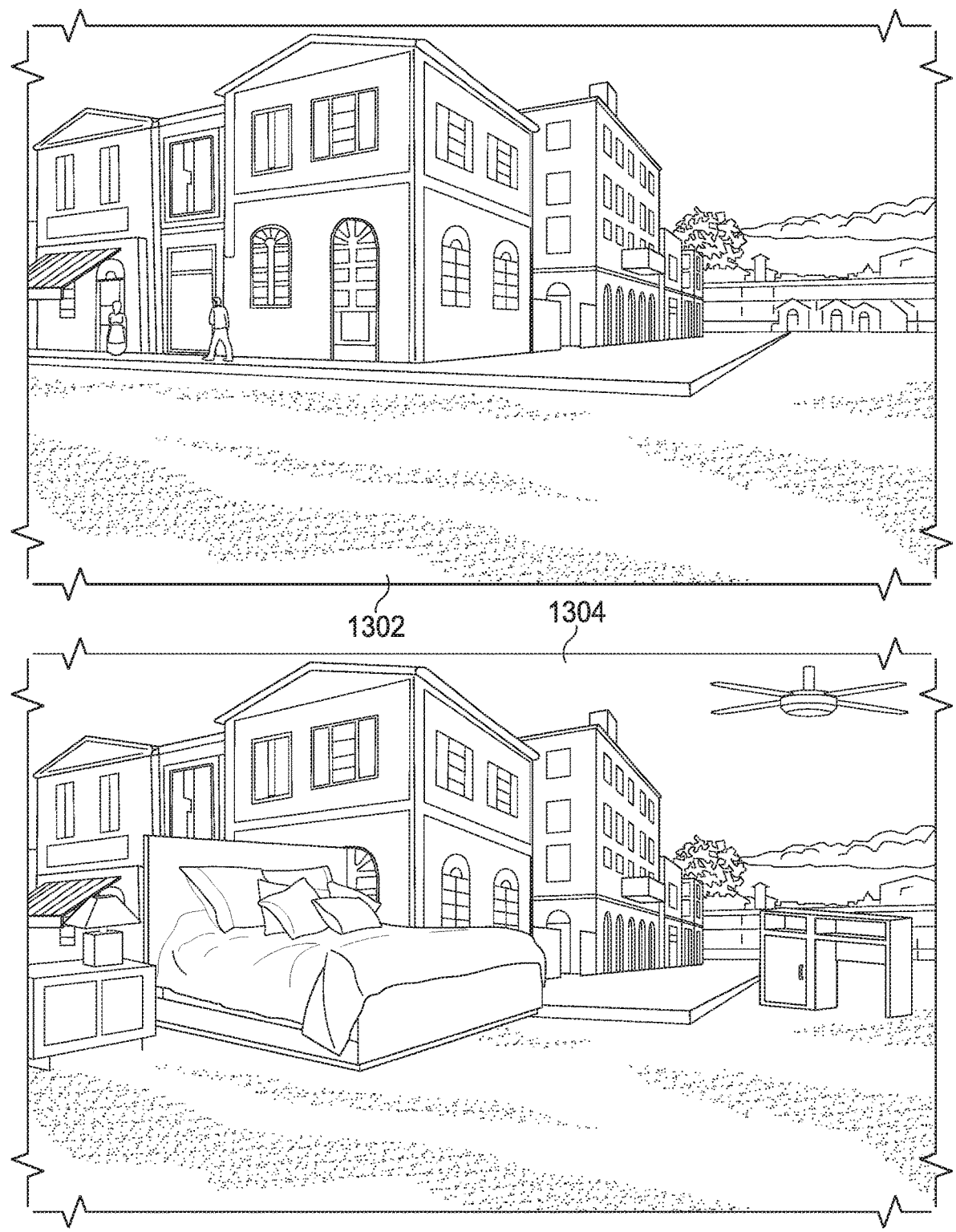
FIG. 13 is a diagram illustrating a graphical user interface presenting depth camera passthrough in accordance with at least one embodiment of the present disclosure.

FIG. 13 illustrates various displays presented to the user during depth camera passthrough in accordance with at least one embodiment of the present disclosure. Display 1302 illustrates an example VR environment rendering presented for display to the user 110, such as by an application executing on electronic device 100. In various situations, it may be desirable for the user to be able to see the real world (e.g., local environment 112) without removing the HMD headset, such as to orient oneself within the bedroom 500, visually confirm that the generated virtual bounded volume is free of obstructions, address another individual, shoo a pet out of the virtual bounded volume, etc. The user 110 may initiate depth camera passthrough by pressing a designated button on the hand-held controller 502 or providing a predetermined gesture using the hand-held controller 502. In the embodiment of FIG. 13, the display 1304 presents images (captured by imaging cameras 114, 116) from the user's actual surroundings overlaid the VR environment rendering. In another embodiment, the electronic device 100 stops the rendering of the VR environment and only displays the images as captured by imaging cameras 114, 116 (such as illustrated on the display 108 of FIG. 1).

Further, depth data and local environment mapping data captured by the electronic device 100 may be used in the generation of virtual content for display in the VR environment rendered for presentation to the user 110. In the examples of FIGS. 5-13, various embodiments include the use of a hand-held controller (e.g., hand-held controller 502 of FIG. 5) with a head-mounted depth camera (e.g., depth sensor 118 of the HMD/electronic device 100) to determine the position of points in 3D space. In addition to providing data regarding the 6DoF orientation of the electronic device 100 relative to the hand-held controller, the hand-held controller position in 3D space can be used as the basis for virtual segmentation of the user's body. For example, inverse kinematics may be applied to match a body model to the depth data provided by the hand-held controller and/or the head-mounted depth camera. Mesh analysis techniques such as connectivity or normals to account for the user's arms, legs, and body during scene reconstruction for a virtual bounded floor plan. That is, if a VR application draws a virtual body for the user, the electronic device 100 will not confuse the user's limbs and virtual body to be unexpected spatial features in the VR environment. Similarly, mesh analysis allows for portions of the user's body to be filtered out such that those portions are not rendered for display in the VR environment or detected as obstacles.

In another example, physical geometry measurements from the depth sensor 118 can also be used for automatic virtual content generation. As previously discussed relative to FIGS. 5-13 in more detail, the physical geometry of the local environment is scanned with a device-mounted depth camera. A sparse visual map may be saved, along with dense geometry representation (e.g., mesh or voxel). Virtual content may be generated live during navigation through VR environments or using pre-scanned geometry during the initial scan of virtual bounded areas. Rather than presenting collision risk objects as point cloud outlines, the electronic device 100 can render those objects as obstacles in the VR environment. For example, the space occupied by desk 504 in FIG. 5 can be rendered as a large boulder in the VR environment such that the user 100 will not attempt to walk through that space.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
    generating depth data at a depth sensor of an electronic device based on a local environment proximate the electronic device;
    defining, by the electronic device using the depth data, an exterior boundary of a virtual bounded volume, wherein the virtual bounded volume comprises a three-dimensional (3D) volumetric area devoid of physical obstructions;
    determining a relative pose of the electronic device within the virtual bounded volume;
    displaying a collision warning on a display of the electronic device based on the relative pose;
    periodically scanning the local environment to obtain depth data from the depth sensor for detecting unmapped objects in the local environment;
    generating, based on detecting an unmapped object in the local environment, an unmapped object warning for display on the display of the electronic device, wherein the unmapped object warning comprises a point cloud representation of the unmapped object; and
    increasing, in response to detecting the unmapped object in the local environment, an operating frequency of the depth sensor.

2. The method of claim 1, further comprising modifying the virtual bounded volume based on receiving at least one user modification to the 3D volumetric area, comprising:
    receiving a user repositioning of at least one of a plurality of device-estimated points designating edges of the 3D volumetric area devoid of physical obstructions in the local environment.

3. The method of claim 2, wherein receiving at least one user modification to the 3D volumetric area comprises:
    receiving the user repositioning of at least one of the plurality of device-estimated points in a live visualization of the local environment using a hand-held controller; and
    generating a modified virtual bounded volume based on the user repositioning of at least one of the device-estimated points.

4. The method of claim 1, wherein determining a relative pose of the electronic device within the virtual bounded volume comprises:
    determining a proximity of the electronic device from the exterior boundary of the virtual bounded volume.

5. The method of claim 4, wherein displaying the collision warning on the display of the electronic device based on the relative pose comprises:
    displaying, overlaid a rendering of a virtual reality environment, the virtual bounded volume as the proximity of the electronic device from the exterior boundary of the virtual bounded volume decreases.

6. The method of claim 4, wherein displaying the collision warning on the display of the electronic device based on the relative pose comprises:
    pausing, based on the relative pose indicating the electronic device being positioned outside the exterior boundary of the virtual bounded volume, a rendering of a virtual reality environment; and
    displaying an instruction urging return to the virtual bounded volume.

7. The method of claim 1, further comprising:
    generating, based on the depth data, a point cloud mapping of objects in the local environment.

8. The method of claim 7, wherein:
    the point cloud representation is based on the point cloud mapping of the unmapped object in the local environment.

9. The method of claim 1, further comprising:
    varying an operating frequency of the depth sensor based on the relative pose of the electronic device.

10. An electronic device, comprising:
    a depth sensor to capture depth data from a local environment proximate the electronic device;
    a processor to define, using the depth data, an exterior boundary of a virtual bounded volume, wherein the virtual bounded volume comprises a three-dimensional (3D) volumetric area devoid of physical obstructions, wherein the processor is configured to detect an unmapped object in the local environment, wherein the processor is configured to increase an operating frequency of the depth sensor in response to detecting the unmapped object in the local environment, and further wherein the processor is configured to determine a relative pose of the electronic device within the virtual bounded volume; and a display to present a collision warning based on the relative pose and to present an unmapped object warning in response to the processor detecting the unmapped object in the local environment, wherein the unmapped object warning comprises a point cloud representation of the unmapped object.

11. The electronic device of claim 10, further comprising:
a controller to provide user input for repositioning at least one of a plurality of points designating edges in the 3D volumetric area devoid of physical obstructions in the local environment.

12. The electronic device of claim 11, wherein:
the processor is to automatically generate a modified virtual bounded volume based on repositioning at least one of the plurality of points.

13. The electronic device of claim 10, wherein:
the processor is to determine a proximity of the electronic device from the exterior boundary of the virtual bounded volume.

14. The electronic device of claim 13, wherein:
the processor is to render for display, overlaid a rendering of a virtual reality environment, the virtual bounded volume as the proximity of the electronic device from the exterior boundary of the virtual bounded volume decreases.

15. The electronic device of claim 10, wherein:
the processor is to pause, based on the relative pose indicating the electronic device being positioned outside the exterior boundary of the virtual bounded volume, a rendering of a virtual reality environment.

16. A non-transitory machine readable medium storing a computer program that when executed by a processor provides a graphical user interface (GUI), the computer program comprising sets of instructions for:
generating depth data at a depth sensor of an electronic device based on a local environment proximate the electronic device;
defining, by the electronic device using the depth data, an exterior boundary of a virtual bounded volume, wherein the virtual bounded volume comprises a three-dimensional (3D) volumetric area devoid of physical obstructions;
determining a relative pose of the electronic device within the virtual bounded volume;
displaying a collision warning on a display of the electronic device based on the relative pose;
periodically scanning the local environment to obtain depth data from the depth sensor for detecting unmapped objects in the local environment;
generating, based on detecting an unmapped object in the local environment, an unmapped object warning for display on the display of the electronic device, wherein the unmapped object warning comprises a point cloud representation of the unmapped object; and
increasing, in response to detecting the unmapped object in the local environment, an operating frequency of the depth sensor.

17. The non-transitory machine readable medium of claim 16, the computer program further comprising sets of instructions for:
receiving a plurality of device-estimated points designating edges of the 3D volumetric area devoid of physical obstructions in the local environment.

18. The non-transitory machine readable medium of claim 16, the computer program further comprising sets of instructions for:
determining a proximity of the electronic device from the exterior boundary of the virtual bounded volume.

19. The non-transitory machine readable medium of claim 18, the computer program further comprising sets of instructions for:
displaying, overlaid a rendering of a virtual reality environment, the virtual bounded volume as the proximity of the electronic device from the exterior boundary of the virtual bounded volume decreases.

20. The non-transitory machine readable medium of claim 16, the computer program further comprising sets of instructions for:
varying an operating frequency of the depth sensor based on the relative pose of the electronic device.

* * * * *